United States Patent
Ukai et al.

(10) Patent No.: US 8,388,917 B2
(45) Date of Patent: Mar. 5, 2013

(54) AIR POLLUTION CONTROL SYSTEM AND AIR POLLUTION CONTROL METHOD

(75) Inventors: Nobuyuki Ukai, Tokyo (JP); Moritoshi Murakami, Tokyo (JP); Susumu Okino, Tokyo (JP); Tatsuto Nagayasu, Tokyo (JP); Seiji Kagawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/059,870

(22) PCT Filed: Feb. 25, 2010

(86) PCT No.: PCT/JP2010/052956
§ 371 (c)(1),
(2), (4) Date: Feb. 18, 2011

(87) PCT Pub. No.: WO2011/104841
PCT Pub. Date: Sep. 1, 2011

(65) Prior Publication Data
US 2011/0268637 A1 Nov. 3, 2011

(51) Int. Cl.
*B01D 53/34* (2006.01)
*B01D 53/50* (2006.01)
*B01D 53/77* (2006.01)
*B01D 53/78* (2006.01)
(52) U.S. Cl. ............... 423/210; 423/235; 423/243.01; 422/168; 422/169; 422/170
(58) Field of Classification Search .................. 423/210, 423/235, 243.01; 422/168, 169, 170
See application file for complete search history.

(56) References Cited

U.S. PATENT DOCUMENTS

| | | | |
|---|---|---|---|
| 6,878,358 | B2 | 4/2005 | Vosteen et al. |
| 2002/0061270 | A1* | 5/2002 | Osborne ................ 423/210 |
| 2004/0013589 | A1 | 1/2004 | Vosteen et al. |
| 2011/0262331 | A1* | 10/2011 | Ukai et al. ............ 423/235 |
| 2011/0268637 | A1 | 11/2011 | Ukai et al. |

FOREIGN PATENT DOCUMENTS

| | | |
|---|---|---|
| JP | 57-136921 A | 8/1982 |
| JP | 59-090617 A | 5/1984 |

(Continued)

OTHER PUBLICATIONS

International Search Report of PCT/JP2010/052956, date of mailing Apr. 6, 2010.

(Continued)

*Primary Examiner* — Timothy Vanoy
(74) *Attorney, Agent, or Firm* — Westerman, Hattori, Daniels & Adrian, LLP

(57) ABSTRACT

An air pollution control system 10A includes a boiler 11 that burns fuel, an air heater 13 that recovers heat of flue gas 17 from the boiler 11, and a desulfurizer 15 that reduces sulfur oxides contained in the flue gas 17 after heat recovery by an absorbent, and waste-water supplying units P0 to P5 that supply desulfurized waste water 28 discharged from the desulfurizer 15 to at least one of a path for supplying fuel to the boiler 11, inside of a furnace of the boiler 11, and the inside of a flue gas duct between the boiler 11 and the air heater 13 are installed. With this configuration, an amount of desulfurized waste water to be returned into the flue gas duct per unit time can be increased as compared to conventional systems, without increasing the size of the entire air pollution control system.

10 Claims, 5 Drawing Sheets

FOREIGN PATENT DOCUMENTS

| | | |
|---|---|---|
| JP | 63-200818 A | 8/1988 |
| JP | 2-211217 A | 8/1990 |
| JP | 9-313881 A | 12/1997 |
| JP | 2003-236334 A | 8/2003 |
| JP | 2005-152745 A | 6/2005 |
| JP | 2007-185558 A | 7/2007 |
| JP | 2009-166013 A | 7/2009 |

OTHER PUBLICATIONS

Written Opinion of the International Searching Authority, issued in corresponding International Application No. PCT/JP2010052956.
U.S. Office Action dated Dec. 31, 2012, issued in co-pending U.S. Appl. No. 13/671,758.

* cited by examiner

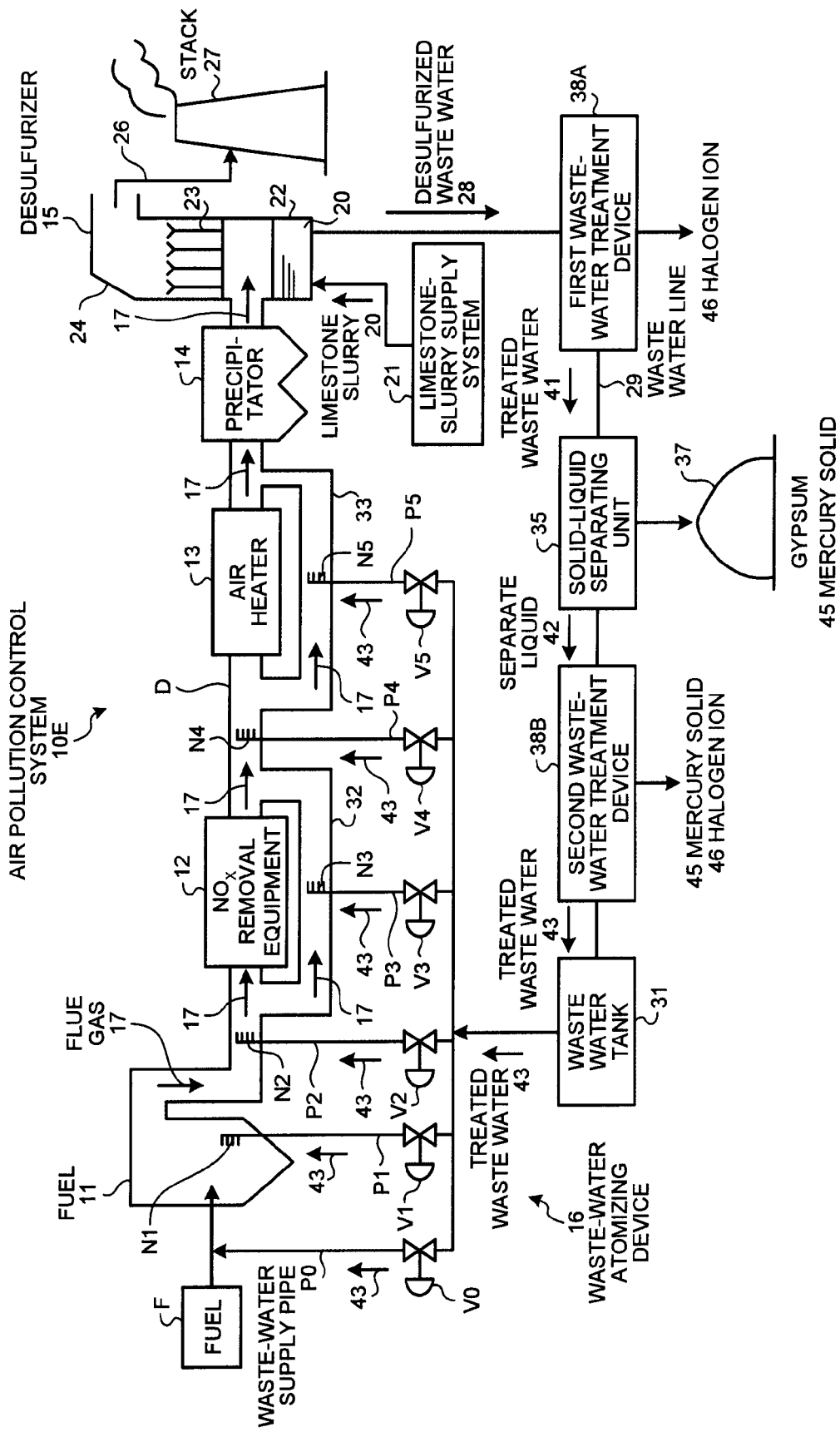

AIR POLLUTION CONTROL SYSTEM AND AIR POLLUTION CONTROL METHOD

FIELD

The present invention relates to an air pollution control system and an air pollution control method for treating flue gas discharged from a boiler.

BACKGROUND

Conventionally, there has been known an air pollution control system for treating flue gas discharged from a boiler installed in a thermal power generation plant or the like. The air pollution control system includes $NO_x$ removal equipment that removes nitrogen oxides from flue gas discharged from a boiler, an air heater that recovers heat of flue gas having passed through the $NO_x$ removal equipment, a precipitator that reduces dust in the flue gas after heat recovery, and a desulfurizer that reduces sulfur oxides in the flue gas after dust reduction. As the desulfurizer, a wet desulfurizer that reduces sulfur oxides in flue gas by bringing a limestone absorbent into gas-liquid contact with flue gas has been generally used.

Waste water discharged from a wet desulfurizer (hereinafter, "desulfurized waste water") contains various types of harmful substances, for example, ions such as chlorine ion and ammonium ion and mercury in large amount. Therefore, these harmful substances need to be removed from the desulfurized waste water before the desulfurized waste water is discharged to outside of the system. However, a removing process of these various types of harmful substances contained in the desulfurized waste water is complicated, and treatment cost is high. Therefore, to reduce the treatment cost of the desulfurized waste water, there has been proposed a method of reusing the desulfurized waste water in the system without discharging it to the outside of the system. For example, Patent Literature 1 discloses an air pollution control system in which a device that atomizes and gasifies desulfurized waste water is separately installed, branched from a flue gas duct of a main line that connects $NO_x$ removal equipment, an air heater, a precipitator, and a desulfurizer, and after a part of flue gas is introduced from the flue gas duct of the main line into the device, and desulfurized waste water is atomized into flue gas in the device and evaporated to precipitate harmful substances, the flue gas is returned to the flue gas duct of the main line.

CITATION LIST

Patent Literature

Patent Literature 1: Japanese Patent Application Laid-open No. H9-313881

SUMMARY

Technical Problem

However, in the air pollution control system according to Patent Literature 1, because a device that atomizes and gasifies desulfurized waste water is separately installed, branched from the flue gas duct of the main line, and after a part of flue gas is introduced from the flue gas duct of the main line into the device, and desulfurized waste water is atomized into flue gas in the device and evaporated, the flue gas is returned to the flue gas duct of the main line, a device for evaporating desulfurized waste water needs to be provided separately. Therefore, there is a problem that the size of the entire air pollution control system increases.

Generally, when the treating amount of flue gas increases, the amount of desulfurized waste water also increases in proportion thereto. However, in the air pollution control system according to Patent Literature 1, because an amount of gas that can be returned to the flue gas duct is limited by the treating capacity of the atomizing device, a large amount of desulfurized waste water cannot be treated in unit time. As a result, the treating amount of flue gas is reduced.

Therefore, it has been desired to increase the amount of desulfurized waste water to be returned to the flue gas duct per unit time as compared to conventional systems, without increasing the size of the entire air pollution control system.

The present invention has been achieved to solve the above problems, and an object of the present invention is to provide an air pollution control system and an air pollution control method capable of increasing the amount of desulfurized waste water to be returned to a flue gas duct per unit time as compared to conventional systems, without increasing the size of the entire air pollution control system.

Solution to Problem

According to an aspect of the present invention, an air pollution control system includes: a boiler that burns fuel; an air heater that recovers heat of flue gas from the boiler; a desulfurizer that reduces sulfur oxides contained in flue gas after heat recovery by an absorbent; a waste-water supplying unit that supplies desulfurized waste water discharged from the desulfurizer to at least one of a path for supplying fuel to the boiler, inside of a furnace of the boiler, and inside of a flue between the boiler and the air heater.

Advantageously, in the air pollution control system, a $NO_x$ removal equipment that removes nitrogen oxides in flue gas from the boiler is provided on an upstream side of the air heater, and the waste-water supplying unit is provided at least at one position between the boiler and the $NO_x$ removal equipment or between the $NO_x$ removal equipment and the air heater.

Advantageously, in the air pollution control system, a bypass pipe is provided at least at one position parallel to the NOx removal equipment or parallel to the air heater, and the waste-water supplying unit is provided in the bypass pipe.

According to another aspect of the present invention, an air pollution control system includes: a boiler that burns fuel; an air heater that recovers heat of flue gas from the boiler; a desulfurizer that reduces sulfur oxides contained in flue gas after heat recovery by an absorbent; a waste-water treating unit that removes harmful substances from desulfurized waste water discharged from the desulfurizer; and a waste-water supplying unit installed at least at one position in a path for supplying fuel to the boiler, inside of a furnace of the boiler, or inside of a flue between the boiler and the air heater to atomize treated waste water treated by the waste-water treating unit.

Advantageously, in the air pollution control system, a $NO_x$ removal equipment that removes nitrogen oxides in flue gas from the boiler is provided on an upstream side of the air heater, and the waste-water supplying unit is provided at least at one position between the boiler and the $NO_x$ removal equipment or between the $NO_x$ removal equipment and the air heater.

Advantageously, in the air pollution control system, a bypass pipe is provided at least at one position parallel to the NOx removal equipment or parallel to the air heater, and the waste-water supplying unit is provided in the bypass pipe.

Advantageously, in the air pollution control system, the waste-water treating unit includes a solid-liquid separating device that separates desulfurized waste water discharged from the desulfurizer into a solid and a liquid.

Advantageously, in the air pollution control system, the waste-water treating unit includes a mercury removing device that removes mercury contained in desulfurized waste water discharged from the desulfurizer.

Advantageously, in the air pollution control system, the waste-water treating unit includes a halogen-ion removing device that removes halogen ions contained in desulfurized waste water discharged from the desulfurizer.

According to still another aspect of the present invention, in an air pollution control method in which after heat of flue gas from a boiler that burns fuel is recovered by an air heater, a desulfurizer reduces sulfur oxides contained in flue gas after heat recovery by an absorbent, desulfurized waste water discharged from the desulfurizer is supplied to at least one of a path for supplying fuel to the boiler, inside of a furnace of the boiler, and inside of a flue gas duct between the boiler and the air heater.

Advantageously, in the air pollution control method, a $NO_x$ removal equipment that removes nitrogen oxides in flue gas from the boiler is provided on an upstream side of the air heater, and the desulfurized waste water is supplied to at least one position between the boiler and the $NO_x$ removal equipment or between the $NO_x$ removal equipment and the air heater.

Advantageously, in the air pollution control method, a bypass pipe is provided at least at one position parallel to the $NO_x$ removal equipment or parallel to the air heater, and the desulfurized waste water is supplied to inside of the bypass pipe.

According to still another aspect of the present invention, in an air pollution control method in which after heat of flue gas from a boiler that burns fuel is recovered by an air heater, a desulfurizer reduces sulfur oxides contained in flue gas after heat recovery by an absorbent, after waste water treatment is performed for removing harmful substances in desulfurized waste water discharged from the desulfurizer, treated waste water treated in the waste water treatment is supplied to at least one of a path for supplying fuel to the boiler, inside of a furnace of the boiler, and inside of a flue gas duct between the boiler and the air heater.

Advantageously, in the air pollution control method, a $NO_x$ removal equipment that removes nitrogen oxides in flue gas from the boiler is provided on an upstream side of the air heater, and the treated waste water is supplied to at least one position between the boiler and the $NO_x$ removal equipment or between the $NO_x$ removal equipment and the air heater.

Advantageously, in the air pollution control method, a bypass pipe is provided at least at one position parallel to the $NO_x$ removal equipment or parallel to the air heater, and the treated waste water is supplied to inside of the bypass pipe.

Advantageously, in the air pollution control method, the waste water treatment includes a solid-liquid separating step of separating desulfurized waste water discharged from the desulfurizer into a solid and a liquid.

Advantageously, in the air pollution control method, the waste water treatment includes a mercury removing step of removing mercury contained in desulfurized waste water discharged from the desulfurizer.

Advantageously, in the air pollution control method, the waste water treatment includes a halogen-ion removing step of removing halogen ions contained in desulfurized waste water discharged from the desulfurizer.

Advantageous Effects of Invention

According to the air pollution control system and the air pollution control method of the present invention, because desulfurized waste water is directly atomized to at least one of the path for supplying fuel to the boiler, the inside of a furnace of the boiler, and the flue gas duct between the boiler and the air heater, a device that evaporates and gasifies the desulfurized waste water does not need to be provided separately like in conventional systems. As a result, the amount of desulfurized waste water from the desulfurizer to be discharged to outside of the system can be decreased without increasing the size of the air pollution control system.

Further, because flue gas in the boiler and in the flue gas duct between the boiler and the air heater is high-temperature gas before heat recovery by the air heater, a large amount of desulfurized waste water can be evaporated in the boiler and in the flue gas duct. Therefore, the amount of waste water to be returned to the flue gas duct per unit time can be increased as compared to conventional systems. As a result, the amount of desulfurized waste water to be treated can be increased as compared to conventional systems, and as a result, the treating amount of flue gas per unit time can be increased.

According to the air pollution control system and the air pollution control method of the present invention, waste water treatment for removing harmful substances from desulfurized waste water discharged from the desulfurizer is performed, and treated waste water having undergone the waste water treatment is directly atomized to at least one of the path for supplying fuel to the boiler, the inside of a furnace of the boiler, and the flue gas duct between the boiler and the air heater. As a result, an increase in concentration of harmful substances in flue gas inside the flue gas duct can be prevented.

BRIEF DESCRIPTION OF DRAWINGS

FIG. 5 is a schematic configuration diagram of an air pollution control system according to a fifth embodiment.

DESCRIPTION OF EMBODIMENTS

Exemplary embodiments of the present invention will be explained below in detail with reference to the accompanying drawings. The present invention is not limited to the embodiments. In addition, constituent elements in the following embodiments include those that can be easily assumed by persons skilled in the art or that are substantially equivalent.

First Embodiment

Figure 1:
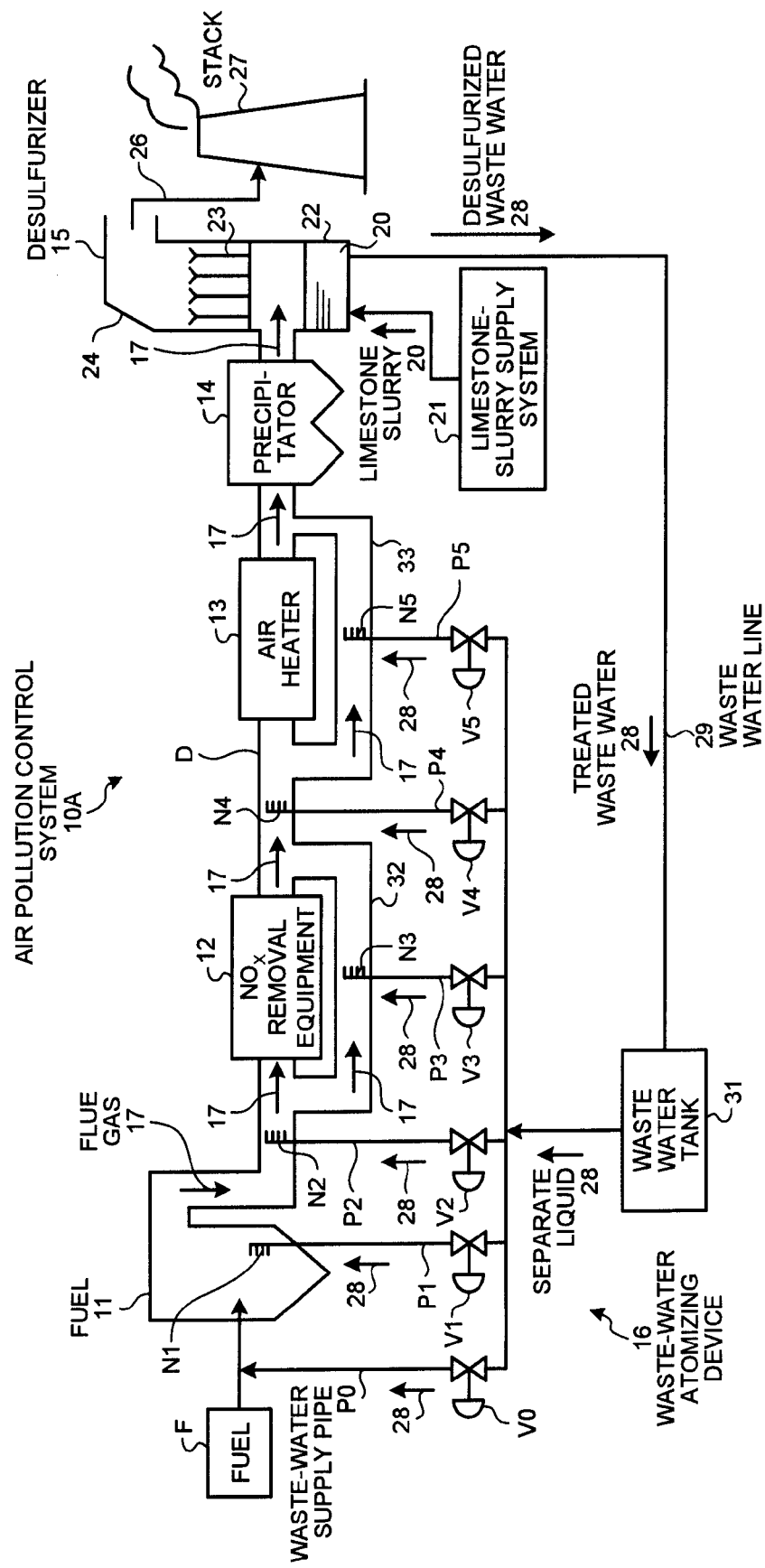
FIG. 1 is a schematic configuration diagram of an air pollution control system according to a first embodiment.

FIG. 1 is a schematic configuration diagram of an air pollution control system according to a first embodiment. An air pollution control system 10A in FIG. 1 removes harmful substances such as nitrogen oxides ($NO_x$), sulfur oxides ($SO_x$), and mercury (Hg) from flue gas 17 discharged from a boiler 11 such as a coal combustion boiler that uses coals as a fuel or a heavy-oil combustion boiler that uses heavy oil as a fuel.

The air pollution control system 10A includes $NO_x$ removal equipment 12 that removes nitrogen oxides in the flue gas 17 from the boiler 11, an air heater 13 that recovers heat of the flue gas 17 having passed through the $NO_x$ removal equipment 12, a precipitator 14 that reduces dust in the flue gas 17 after heat recovery, a desulfurizer 15 that reduces sulfur oxides in the flue gas 17 after dust reduction according to a wet method, and a waste-water atomizing device 16 that supplies desulfurized waste water 28 discharged from the desulfurizer 15 to at least one of a path for supplying fuel F to the boiler 11, the inside of a furnace of the boiler 11, and the inside of the flue gas duct between the boiler 11 and the air heater 13. Accordingly, an amount of desulfurized water to be returned to the boiler 11 and the inside of the flue gas duct D per unit of time can be increased as compared to conventional systems.

The $NO_x$ removal equipment 12 removes nitrogen oxides in the flue gas 17 from the boiler 11, and includes an $NO_x$ removal catalyst layer (not shown) therein. A reducing agent injector (not shown) is arranged on an upstream side of the $NO_x$ removal catalyst layer, and a reducing agent is injected to the flue gas 17 from the reducing agent injector. As the reducing agent, for example, ammonia, urea, or ammonium chloride is used. Flue gas 17 introduced into the $NO_x$ removal equipment 12 comes in contact with the $NO_x$ removal catalyst layer, and nitrogen oxides in the flue gas 17 are decomposed into nitrogen gas ($N_2$) and water ($H_2O$) and removed. When a chlorine (Cl) content in the flue gas 17 increases, the proportion of a bivalent mercury chloride soluble in water increases, and mercury can be easily collected by the desulfurizer 15 described later.

The $NO_x$ removal equipment 12 is not essential, and when the concentration of nitrogen oxides or the mercury concentration in the flue gas 17 from the boiler 11 is very low or these substances are not contained in the flue gas 17, the $NO_x$ removal equipment 12 can be omitted.

The air heater 13 is a heat exchanger that recovers heat in the flue gas 17 in which nitrogen oxides have been removed by the $NO_x$ removal equipment 12. Because the temperature of the flue gas 17 having passed through the $NO_x$ removal equipment 12 is as high as about 350° C. to 400° C., the air heater 13 performs heat exchange between the high-temperature flue gas 17 and combustion air at a normal temperature. Combustion air, which becomes high temperature by heat exchange, is supplied to the boiler 11. On the other hand, the flue gas 17 having been heat-exchanged with combustion air at a normal temperature is cooled to about 150° C.

The precipitator 14 reduces dust in the flue gas 17 after heat recovery. As the precipitator 14, a centrifugal precipitator, a filtering precipitator, and an electric precipitator can be mentioned; however, it is not particularly limited thereto.

The desulfurizer 15 reduces sulfur oxides in the flue gas 17 after dust reduction according to a wet method.

In the desulfurizer 15, a limestone slurry 20 (a solution in which limestone powder is dissolved in water) is used as an alkaline absorbent, and the temperature inside the desulfurizer is adjusted to about 30° C. to 50° C. The limestone slurry 20 is supplied from a limestone-slurry supply system 21 to a column bottom part 22 of the desulfurizer 15. The limestone slurry 20 supplied to the column bottom part 22 of the desulfurizer 15 is supplied to a plurality of nozzles 23 in the desulfurizer 15 via an absorbent supply line (not shown), and is ejected from the nozzles 23 toward a column top part 24 of the desulfurizer 15. Because the flue gas 17 rising from the column bottom part 22 of the desulfurizer 15 comes in gas-liquid contact with the limestone slurry 20 ejected from the nozzles 23, sulfur oxides and mercury chloride in the flue gas 17 are absorbed by the limestone slurry 20, and separated and removed from the flue gas 17. The flue gas 17 purified by the limestone slurry 20 is discharged from the column top part 24 of the desulfurizer 15 as purged gas 26, and discharged to outside of the air pollution control system from a stack 27.

At the inside of the desulfurizer 15, sulfur oxides $SO_x$ in the flue gas 17 causes a reaction with a limestone slurry 19 represented by the following expression (1).

$$CaCO_3 + SO_2 + 0.5H_2O \rightarrow CaSO_3 \cdot 0.5H_2O + CO_2 \quad (1)$$

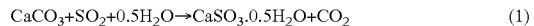

The limestone slurry 20 that has absorbed $SO_x$ in the flue gas 17 is then oxidized by air (not shown) supplied to the column bottom part 22 of the desulfurizer 15, to cause a reaction with air represented by the following expression (2).

$$CaSO_3 \cdot 0.5H_2O + 0.5O_2 + 1.5H_2O \rightarrow CaSO_4 \cdot 2H_2O \quad (2)$$

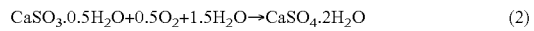

In this manner, $SO_x$ in the flue gas 17 is captured in a state of gypsum $CaSO_4 \cdot 2H_2O$ in the desulfurizer 15.

As described above, while a solution accumulated in the column bottom part 22 of the desulfurizer 15 and pumped is used as the limestone slurry 20, gypsum $CaSO_4 \cdot 2H_2O$ is mixed in the limestone slurry to be pumped by an operation of the desulfurizer 15, according to the above reaction expressions (1) and (2). The limestone gypsum slurry (a limestone slurry mixed with gypsum) to be pumped is hereinafter referred to as "absorbent".

The absorbent (the limestone gypsum slurry) used for desulfurization is discharged to outside from the column bottom part 22 of the desulfurizer 15 as the desulfurized waste water 28, and supplied to a waste water tank 31 via a desulfurized waste-water line 29 explained below. As well as gypsum, heavy metal such as mercury and halogen ions such as $Cl^-$, $Br^-$, $I^-$, and $F^-$ are included in the desulfurized waste water 28.

The boiler 11, the $NO_x$ removal equipment 12, the air heater 13, the precipitator 14, and the desulfurizer 15 are connected by one flue gas duct D. A bypass pipe 32 for connecting the flue gas duct D on an upstream side and on a downstream side of the $NO_x$ removal equipment 12 is provided at a position parallel to the $NO_x$ removal equipment 12. Likewise, a bypass pipe 33 for connecting the flue gas duct D on an upstream side and on a downstream side of the air heater 13 is provided at a position parallel to the air heater 13. By having such a configuration, the desulfurized waste water 28 can be atomized also into the flue gas 17 circulating in the respective bypass pipes 32 and 33. The respective bypass pipes 32 and 33 are configured so that an amount of flue gas circulating therein becomes about several percents of the amount of flue gas circulating in the flue gas duct D.

The waste-water atomizing device 16 includes the waste water line 29 for supplying the desulfurized waste water (gypsum slurry) 28 discharged from the desulfurizer 15 to the waste water tank 31, the waste water tank 31 that accumulates desulfurized waste water 28, and a plurality of waste-water supplying pipes (waste-water supplying units) P0 to P5 respectively connected to the waste water tank 31 to supply the desulfurized waste water 28 accumulated in the waste water tank 31 into the path for supplying the fuel F to the boiler 11, the inside of a furnace of the boiler 11, the inside of the flue gas duct D, and the inside of the bypass pipes 32 and 33. Nozzles N1 to N5 for atomizing the desulfurized waste water 28 are fitted to the ends of the waste-water supplying pipes P1 to P5.

The waste-water supplying pipes P1 to P5 are installed at positions where the high-temperature flue gas 17 before heat recovery by the air heater 13 is circulated, that is, on the upstream side of the air heater 13. In the example shown in FIG. 1, the waste-water supplying pipe P1 is connected to the boiler 11, and the nozzle N1 is installed at the inside of a furnace of the boiler 11. Specifically, the nozzle N1 is installed on the side of the furnace or on a furnace wall in an upper part of the furnace, so that the desulfurized waste water 28 is atomized from the nozzle N1 toward a flame portion at the center of the furnace or above the flame. The waste-water supplying pipe P2 is connected to the flue gas duct D between an outlet of the boiler 11 and the $NO_x$ removal equipment 12, and the nozzle N2 is installed to the inside of the flue gas duct D. The waste-water supplying pipe P3 is connected to the bypass pipe 32 for connecting the flue gas ducts D on the upstream side and on the downstream side of the $NO_x$ removal equipment 12, and the nozzle N3 is installed to the inside of the bypass pipe 32. The waste-water supplying pipe P4 is connected to the flue gas duct D between the $NO_x$ removal equipment 12 and the air heater 13, and the nozzle N4 is installed to the inside of the flue gas duct D. The waste-water supplying pipe P5 is connected to the bypass pipe 33 for connecting the flue gas ducts D on the upstream side and on the downstream side of the air heater 13, and the nozzle N5 is installed to the inside of the bypass pipe 33.

As the nozzles N1 to N5, for example, a two-fluid nozzle or a rotary atomizer is used. It is desired that a mist diameter of the nozzles N1 to N5 is such that a maximum particle diameter is equal to or less than 200 micrometers and an average particle diameter is from 30 to 70 micrometers. Accordingly, contact efficiency with the flue gas 17 is improved, thereby enabling to improve evaporation efficiency.

The gas temperature in a furnace of the boiler 11 where the nozzle N1 is installed is as high as 1400° C. to 1600° C., which is the highest temperature in the system, and thus a largest amount of the desulfurized waste water 28 can be evaporated. Further, the flue gas temperature inside the flue gas duct D between the outlet of the boiler 11 and the $NO_x$ removal equipment 12 where the nozzle N2 is installed is about 500° C., and the flue gas temperature in the flue gas duct D between the $NO_x$ removal equipment 12 and the air heater 13 where the nozzle N4 is installed and in the bypass pipes 32 and 33 where the nozzles N3 and N5 are installed is respectively about 350° C. to 400° C., and although the temperature is lower than that in the furnace of the boiler 11, the desulfurized waste water 28 can be reliably evaporated. On the other hand, the temperature of the flue gas 17 having passed through the air heater 13 decreases to about 150° C., and thus the desulfurized waste water 28 cannot be evaporated sufficiently.

The waste-water supplying pipe P0 is installed in the path for supplying the fuel F to the boiler 11. The path for supplying the fuel F to the boiler 11 is, specifically, inside of a fuel supply system (not shown) or a pipe for connecting the fuel supply system and the boiler 11. The desulfurized waste water 28 supplied from the waste-water supplying pipe P0 into the fuel F is mixed with the fuel F, input to the boiler 11 together with the fuel F, and evaporated in the boiler.

Opening/closing valves V0 to V5 are respectively installed in the waste-water supplying pipes P0 to P5, and by controlling an opening/closing degree of the opening/closing valves V0 to V5, a flow rate of the desulfurized waste water 28 to be supplied to the waste-water supplying pipes P0 to P5 is adjusted. The desulfurized waste water 28 accumulated in the waste water tank 31 passes through the waste-water supplying pipes P1 to P5 and is atomized from the respective nozzles N1 to N5 into the high-temperature flue gas 17 inside of the furnace of the boiler 11, inside of the flue gas duct D, and inside of the bypass pipes 32 and 33, and is also supplied to the path for supplying the fuel F to the boiler 11 through the waste-water supplying pipe P0.

The desulfurized waste water 28 atomized from the nozzles N1 to N5 into the high-temperature flue gas 17 is evaporated to become water vapor, and thereafter, supplied into the desulfurizer 15 together with the flue gas 17. Because the temperature in the desulfurizer 15 is as high as 30° C. to 50° C., most of the water vapor introduced into the desulfurizer 15 is devolatilized, and mixed with the limestone slurry 20 in the column bottom part 22. Meanwhile, the water vapor, which is not devolatilized, is discharged from the stack 27 together with the purged gas 26.

As described above, because the desulfurized waste water 28 is directly atomized into the high-temperature flue gas 17 before heat recovery by the air heater 13, even if the amount of the desulfurized waste water 28 to be atomized is large, the desulfurized waste water 28 can be evaporated reliably, and thus the amount of the desulfurized waste water 28 to be returned to the flue gas duct D per unit time can be increased as compared to conventional systems. As a result, the whole amount of the desulfurized waste water 28 discharged from the desulfurizer 15 can be returned to the flue gas duct D, and discharge of waste water to the outside of the system can be eliminated completely.

Because an amount of the desulfurized waste water 28 to be discharged from the desulfurizer 15 also increases in proportion to the treating amount of the flue gas 17, the amount of the desulfurized waste water 28 to be returned to the flue gas duct D per unit time is increased, thereby increasing an amount of waste water that can be treated per unit time. As a result, the treating amount of flue gas per unit time can be increased as compared to conventional systems.

In the first embodiment, the bypass pipe 32 that connects the flue gas ducts D on the upstream side and on the downstream side of the $NO_x$ removal equipment 12 and the bypass pipe 33 that connects the flue gas ducts D on the upstream side and on the downstream side of the air heater 13 are provided, and the desulfurized waste water 28 is atomized into the flue gas 17 inside the bypass pipes 32 and 33 and evaporated. Therefore, when there is a possibility that dry particles such as ash generated due to evaporation of the desulfurized waste water 28 pass through the $NO_x$ removal equipment 12 and the air heater 13 to decrease effects of these devices, dry particles can be efficiently delivered to the downstream side of the $NO_x$ removal equipment 12 and the air heater 13 via the respective bypass pipes 32 and 33.

As described above, the temperature of the flue gas 17 is different according to positions in the flue gas duct D, and evaporation efficiency of the desulfurized waste water 28 is also different. Therefore, the opening/closing degree of the valves V0 to V5 is optimized, taking into consideration delivery efficiency of dry particles and evaporation efficiency of the flue gas 17.

The configuration of the waste-water atomizing device 16 shown in FIG. 1 is only an example, and the number of installation and installation positions of the waste-water supplying pipes P0 to P5 are not limited thereto, and can be appropriately changed according to the amount of the desulfurized waste water 28 and the kind of the flue gas 17. That is, the waste-water supplying pipes P0 to P5 only need to be installed at least at one position of the path for supplying the fuel F to the boiler 11, the inside of a furnace of the boiler 11, the flue gas duct D from an outlet of the boiler 11 to an inlet of the air heater, and the bypass pipes 32 and 33.

When harmful substances and solid contents are contained in the desulfurized waste water 28 only in a small amount, and even if the desulfurized waste water 28 is atomized into the flue gas duct D on the upstream side of the $NO_x$ removal equipment 12 and the air heater 13, there is no possibility of decreasing effects of the $NO_x$ removal equipment 12 and the air heater 13, the bypass pipes 32 and 33 do not need to be provided. Further, it is not required to provide both of the bypass pipes 32 and 33, and only either one of bypass pipes can be provided.

Further, in the waste-water atomizing device 16 shown in FIG. 1, the desulfurized waste water 28 is temporarily accumulated in the waste water tank 31, and the desulfurized waste water 28 is supplied from the waste water tank 31 to the waste-water supplying pipes P0 to P5. However, the desulfurized waste water 28 supplied from the desulfurizer 15 can be directly supplied to the waste-water supplying pipes P0 to P5.

As explained above, in the air pollution control system 10A according to the first embodiment, the waste-water supplying pipes P0 to P5 that supply the desulfurized waste water 28 discharged from the desulfurizer 15 to at least one of the path for supplying the fuel F to the boiler 11, the inside of a furnace of the boiler 11, and the inside of the flue gas duct D from the boiler 11 to the air heater 13 are installed, and the desulfurized waste water 28 is directly supplied by the waste-water supplying pipes P0 to P5. By having such a configuration, because a device for gasifying desulfurized waste water does not need to be provided separately like in conventional systems, the amount of the desulfurized waste water 28 to be discharged to the outside of the system can be decreased, without increasing the size of the entire air pollution control system.

Further, because the desulfurized waste water 28 is directly atomized into the high-temperature flue gas 17 before heat recovery by the air heater 13, even if the amount of the desulfurized waste water 28 to be atomized is large, the desulfurized waste water 28 can be evaporated reliably, and the amount of the desulfurized waste water 28 to be returned to the flue gas duct D per unit time can be increased as compared to conventional systems. As a result, the whole amount of the desulfurized waste water 28 to be discharged from the desulfurizer 15 can be returned to the flue gas duct D, and discharge of waste water to the outside of the system can be eliminated completely. Further, the amount of the desulfurized waste water 28 to be returned to the flue gas duct D per unit time is increased as compared to conventional systems, thereby increasing an amount of the desulfurized waste water 28 that can be treated per unit time. As a result, the treating amount of flue gas per unit time can be increased as compared to conventional systems.

The bypass pipe 32 that connects the flue gas ducts D on the upstream side and on the downstream side of the $NO_x$ removal equipment 12 is provided, and the desulfurized waste water 28 is atomized into the flue gas 17 inside the bypass pipe 32 and evaporated. Therefore, dry particles such as ash generated due to evaporation of the desulfurized waste water 28 can be efficiently delivered to the downstream side of the $NO_x$ removal equipment 12 via the bypass pipe 32. Likewise, the bypass pipe 33 that connects the flue gas ducts D on the upstream side and on the downstream side of the air heater 13 is provided, and the desulfurized waste water 28 is atomized into the flue gas 17 inside the bypass pipe 33 and evaporated. Therefore, dry particles such as ash generated due to evaporation of the desulfurized waste water 28 can be efficiently delivered to the downstream side of the air heater 13 via the bypass pipe 33.

In the example shown in FIG. 1, a case that the whole amount of the desulfurized waste water 28 discharged from the desulfurizer 15 is returned to at least one of the path for supplying the fuel F to the boiler 11, the inside of a furnace of the boiler 11, the inside of the flue gas duct D, and the inside of the bypass pipes 32 and 33 is explained. However, when the amount of the desulfurized waste water 28 increases due to an increase in the treating amount of the flue gas 17 and the whole amount of the desulfurized waste water 28 cannot be returned, after harmful substances are removed and pH is adjusted, a part of the desulfurized waste water 28 can be discharged to the outside of the system.

Second Embodiment

Figure 2:
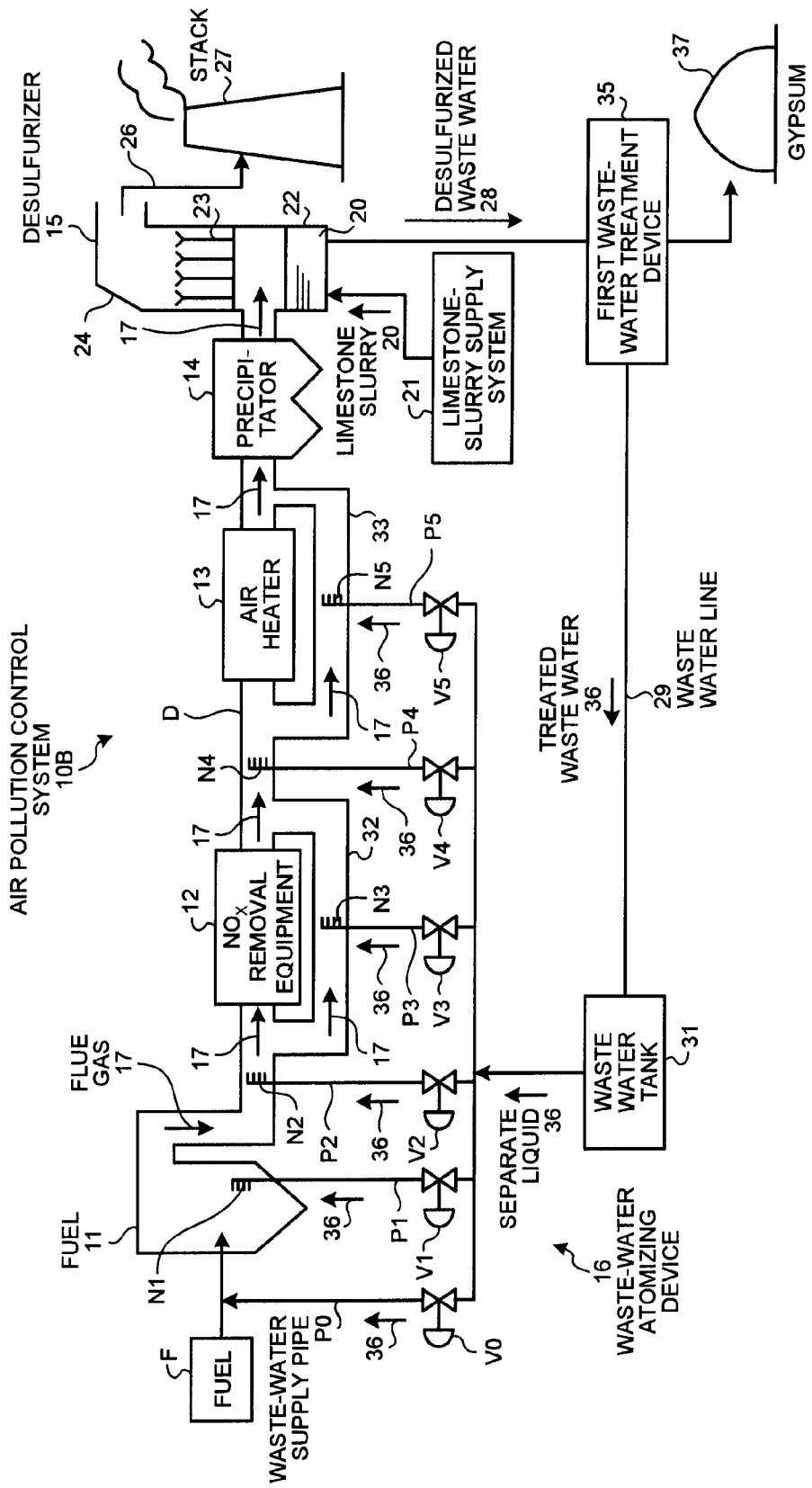
FIG. 2 is a schematic configuration diagram of an air pollution control system according to a second embodiment.

An air pollution control system according to a second embodiment is explained next. Constituent elements identical to those in the first embodiment described above are denoted by like reference signs and explanations thereof will be omitted. FIG. 2 is a schematic configuration diagram of an air pollution control system 10B according to the second embodiment. In the first embodiment, the desulfurized waste water 28 is directly atomized into the flue gas 17 in the boiler 11 and inside of the flue gas duct D without performing the waste-water treatment of the desulfurized waste water 28 discharged from the desulfurizer 15. However, in the air pollution control system 10B according to the second embodiment, it is different from the first embodiment that a solid-liquid separating device 35 is provided in the middle of the waste water line 29 so that the desulfurized waste water 28 from the desulfurizer 15 is separated into a solid fraction and a liquid fraction by the solid-liquid separating device 35, and the separate liquid (treated waste water) is supplied into the path for supplying the fuel F to the boiler 11, the inside of a furnace of the boiler 11, the inside of the flue gas duct D, and the inside of the bypass pipes 32 and 33. Other configurations of the second embodiment are identical to those of the first embodiment.

The solid-liquid separating device 35 separates the desulfurized waste water 28 into a solid fraction including gypsum and a liquid fraction. As the solid-liquid separating device 35, for example, a belt filter, a centrifugal separator, or a decanter type centrifugal settler is used. Gypsum 37 in the desulfurized waste water 28 discharged from the desulfurizer 15 is separated by the solid-liquid separating device 35. At this time, mercury chloride in the desulfurized waste water 28 is separated from the liquid together with the gypsum 37 in a state of being adsorbed on the gypsum 37. The separated gypsum 37 is discharged to outside of the air pollution control system (hereinafter, "outside of the system"). On the other hand, separate liquid (treated waste water) 36 is supplied to the waste water tank 31 via the waste water line 29. The separate liquid (treated waster water) 36 accumulated in the waste water tank 31 is supplied into the path for supplying the fuel F to the boiler 11, the inside of a furnace of the boiler 11, the inside of the flue gas duct D, and the inside of the bypass pipes 32 and 33 via the waste-water supplying pipes P0 to P5, and evaporated.

As described above, in the air pollution control system 10B according to the second embodiment, the gypsum 37 is separated from the desulfurized waste water 28 discharged from the desulfurizer 15, and the separate liquid 36 is supplied into the path for supplying the fuel F to the boiler 11, the inside of a furnace of the boiler 11, the inside of the flue gas duct D, and the inside of the bypass pipes 32 and 33. By having such a configuration, the amount of dry particles generated due to evaporation of waste water in the flue gas duct D can be decreased as compared to the first embodiment, in addition to effects of the first embodiment. As a result, reaction inhibition in the $NO_x$ removal equipment 12 due to adhesion of dry particles and clogging of the $NO_x$ removal equipment 12 and the air heater 13 can be decreased, thereby improving the flexibility of installation positions of the nozzles N1 to N5. Further, because mercury chloride is separated and removed together with the gypsum 37 by solid-liquid separation of the desulfurized waste water 28, an increase in mercury concentration in the flue gas 17 inside the flue gas duct D can be prevented at the time of atomizing waste water.

Third Embodiment

Figure 3:
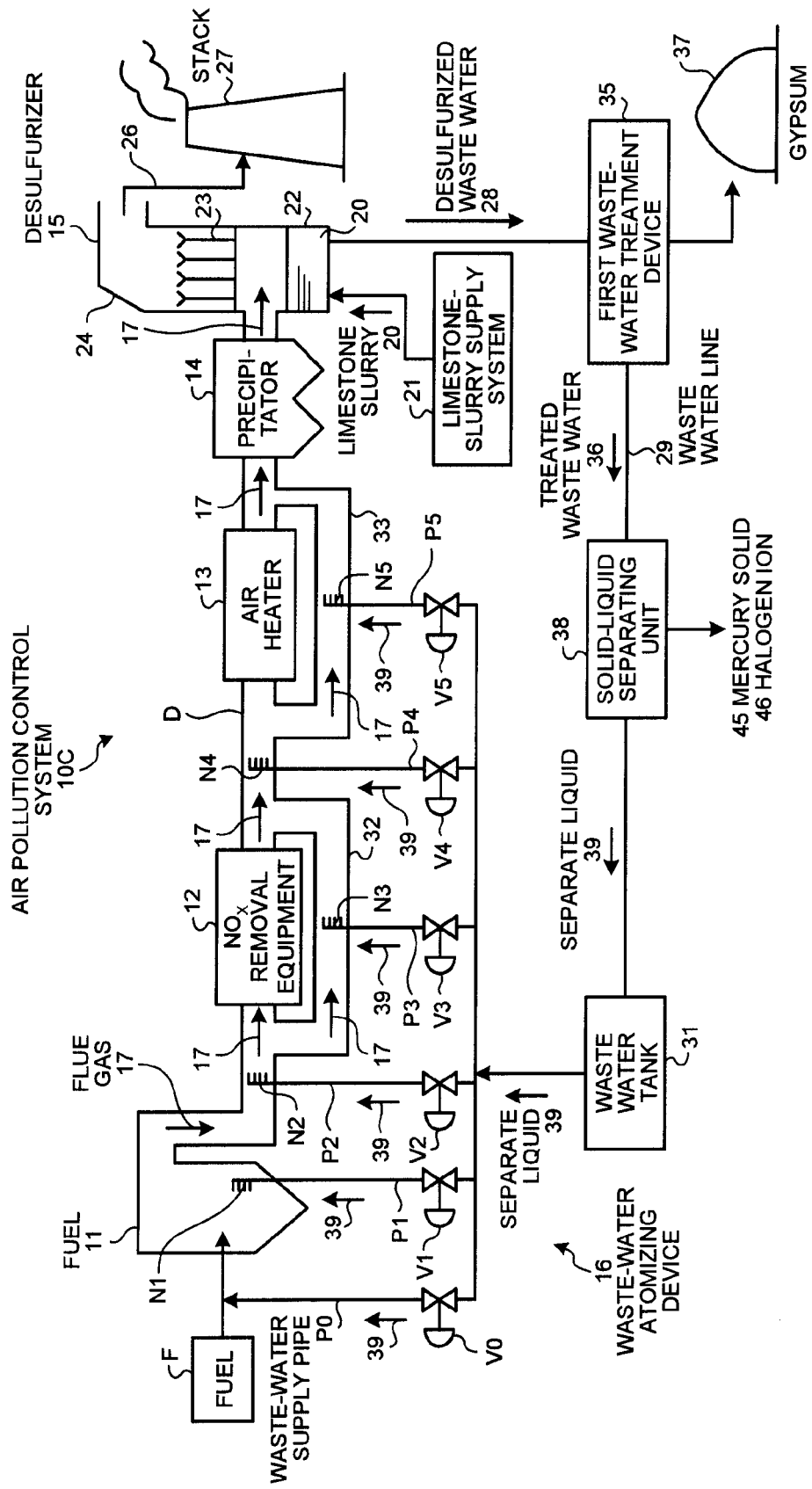
FIG. 3 is a schematic configuration diagram of an air pollution control system according to a third embodiment.

An air pollution control system according to a third embodiment is explained next. Constituent elements identical to those in the first and second embodiments described above are denoted by like reference signs and explanations thereof will be omitted. FIG. 3 is a schematic configuration diagram of the air pollution control system 10B according to the second embodiment. In the second embodiment, the solid-liquid separating device 35 is provided in the middle of the waste water line 29 to perform solid-liquid separation of the desulfurized waste water 28 discharged from the desulfurizer 15, and the separate liquid 36 is supplied into the path for supplying the fuel F to the boiler 11, the inside of a furnace of the boiler 11, the inside of the flue gas duct D, and the inside of the bypass pipes 32 and 33. However, in an air pollution control system 10C according to the third embodiment, it is different from the second embodiment that a waste-water treatment device 38 is further provided on a downstream side of the solid-liquid separating device 35, and treated waste water 39 is atomized into the flue gas 17 after harmful substances, suspended solids or the like in the separate liquid 36 are removed by the waste-water treatment device 38. Other configurations of the third embodiment are identical to those of the second embodiment.

The waste-water treatment device 38 includes a unit that removes substances such as mercury (that cannot be adsorbed on the gypsum 37), boron, and selenium remaining in the separate liquid 36 (hereinafter, "mercury removing unit"), and a unit that removes halogen ions such as chlorine ion ($Cl^-$), bromine ion ($Br^-$), iodine ion ($I^-$), and fluorine ion ($F^-$) (hereinafter, "halogen-ion removing unit").

Substances such as mercury, boron, and selenium are easily dissolved in water and volatilize at the time of being atomized into the flue gas 17, and thus it is difficult to remove these substances by the precipitator 14. As the means for removing these substances, removal by precipitation due to cohesion by adding a sulfide coagulation aid, removal by adsorption (an entrained bed) on activated carbon, removal by precipitation by adding a chelating agent, and crystallization can be mentioned. The harmful substances are solidified by the mercury removing unit described above, and solids are discharged to the outside of the system.

Because halogen ions have a property of suppressing adsorption of mercury on the gypsum 37 in a desulfurizing process performed by the desulfurizer 15, it is desired to remove halogen ions from the desulfurized waste water 28. As the unit that removes halogen ions, a concentrating unit using a reverse osmosis membrane, a concentrating unit using an ion exchange membrane, a concentrating unit using electrodialysis can be mentioned, as well as a distillation or crystallization technique. Halogen ions are concentrated by the halogen-ion removing unit described above, and concentrates are discharged to the outside of the system.

The gypsum 37 that has adsorbed mercury chloride is separated from the desulfurized waste water 28 discharged from the desulfurizer 15 by the solid-liquid separating device 35, and the gypsum 37 is discharged to the outside of the system. The separate liquid 36 in which the gypsum 37 has been removed is supplied to the waste-water treatment device 38 via the waste water line 29, and harmful substances such as mercury, boron, and selenium remaining in the separate liquid 36 is removed by the mercury removing unit. The treated waste water after mercury has been removed is supplied to the halogen-ion removing unit, where halogen ions are removed. The treated waste water 39 after halogen ions have been removed is supplied to the waste water tank 31. The treated waste water 39 accumulated in the waste water tank 31 is supplied into the path for supplying the fuel F to the boiler 11, the inside of a furnace of the boiler 11, the inside of the flue gas duct D, and the inside of the bypass pipes 32 and 33 via the waste-water supplying pipes P0 to P5, and evaporated.

The waste-water treatment device 38 does not need to include both of the mercury removing unit and the halogen-ion removing unit, and either unit is selected according to the property of the desulfurized waste water 28 and installed. For example, when treatment for oxidizing mercury by the $NO_x$ removal equipment 12 and converting oxidized mercury to mercury chloride is to be performed, because $Cl^-$ can be useful, the treatment performed by the halogen-ion removing unit can be omitted, and the treated waste water 39 containing halogen ions can be atomized into the flue gas 17. When mercury is sufficiently removed in the solid-liquid separating device 35 on the upstream side of the waste-water treatment device 38, and a mercury content is considerably low or mercury is not contained in the separate liquid 36, the treatment performed by the mercury removing unit can be omitted.

The order of the mercury removal treatment and halogen-ion removal treatment performed by the waste-water treatment device 38 is not particularly limited. That is, the halogen-ion removal treatment can be performed after performing the mercury removal treatment, or the mercury removal treatment can be performed after performing the halogen-ion removal treatment.

As described above, in the air pollution control system 10C according to the third embodiment, after the gypsum 37, which is a large object, is separated from the desulfurized waste water 28 discharged from the desulfurizer 15, fine substances such as mercury, boron, selenium, and halogen ions are removed, and the treated waste water 39 is supplied into the path for supplying the fuel F to the boiler 11, the inside of a furnace of the boiler 11, the inside of the flue gas duct D, and the inside of the bypass pipes 32 and 33. By having such a configuration, an increase in mercury concentration in the flue gas 17 inside of the flue gas duct D can be prevented at the time of atomizing waste water, in addition to effects of the second embodiment that an amount of dry particles generated due to evaporation of waste water in the flue gas duct D can be decreased.

Fourth Embodiment

Figure 4:
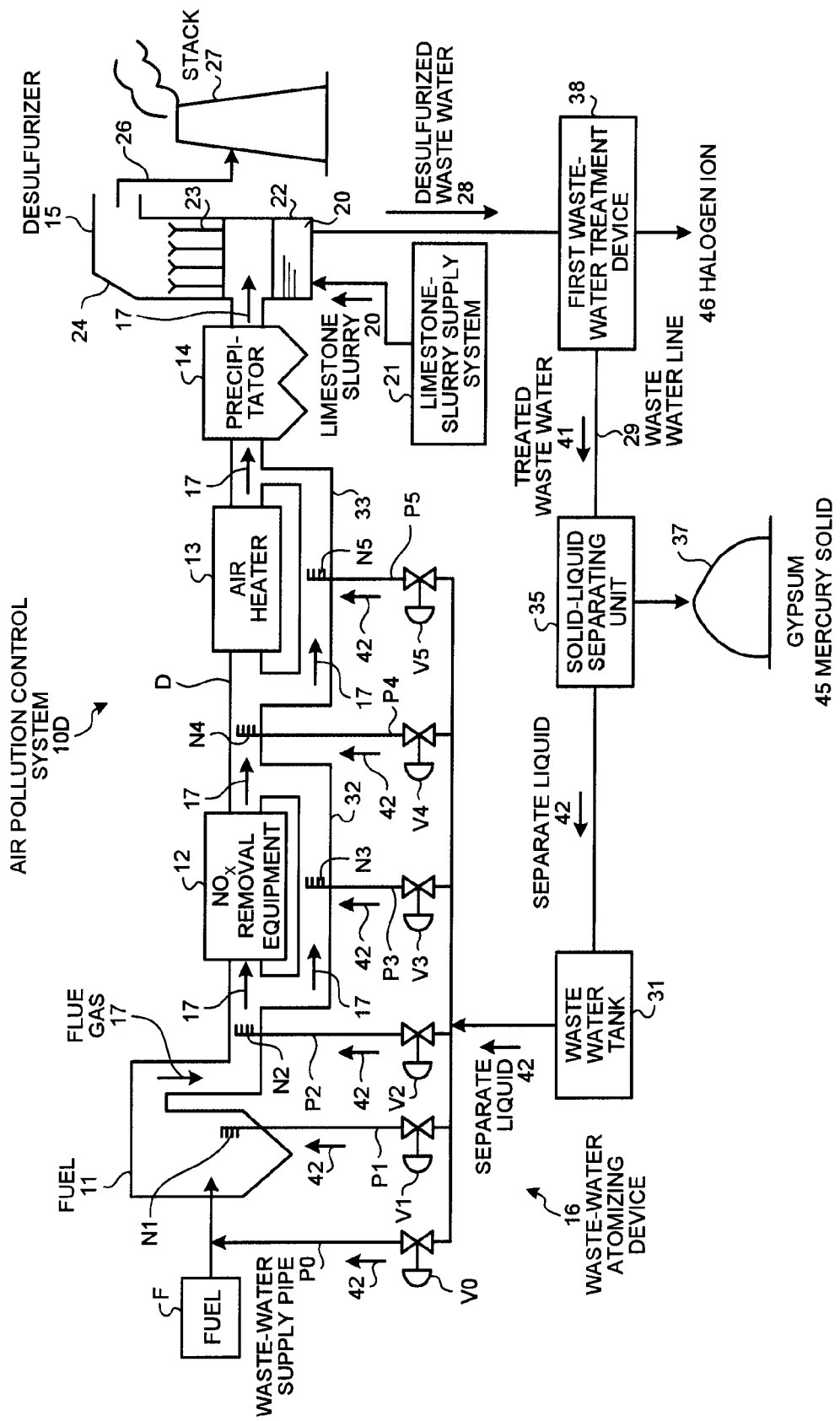
FIG. 4 is a schematic configuration diagram of an air pollution control system according to a fourth embodiment.

An air pollution control system according to a fourth embodiment is explained next. Constituent elements identical to those in the first to third embodiments described above are denoted by like reference signs and explanations thereof will be omitted. FIG. 4 is a schematic configuration diagram of an air pollution control system 10D according to the fourth embodiment. In the third embodiment, the waste-water treatment device 38 is provided on the downstream side of the solid-liquid separating device 35. However, in the fourth embodiment, it is different from the third embodiment that the waste-water treatment device 38 is provided on the upstream side of the solid-liquid separating device 35. Other configurations of the fourth embodiment are identical to those of the third embodiment.

The desulfurized waste water 28 discharged from the desulfurizer 15 is first supplied to the waste-water treatment device 38, where fine substances such as mercury, boron, and selenium contained in the desulfurized waste water 28 are solidified by the means using cohesion, adsorption on activated carbon, chelating agent, or crystallization described above. Further, halogen ions such as $Cl^-$, $Br^-$, $I^-$, and $F^-$ become concentrated by the concentration means using the reverse osmosis membrane, ion exchange membrane, or electrodialysis, distillation or the like as described above, and concentrates are separated. Treated waste water 41 containing solid substances such as mercury is supplied to the solid-liquid separating device 35 via the waste water line 29, and the solid substances are separated and removed together with the gypsum 37 containing mercury chloride. Separate liquid 42 separated from the solid content by the solid-liquid separating device 35 is supplied to the waste water tank 31. The separate liquid (treated waste water) 42 accumulated in the waste water tank 31 is supplied into the path for supplying the fuel F to the boiler 11, the inside of a furnace of the boiler 11, the inside of the flue gas duct D, and the inside of the bypass pipes 32 and 33 via the waste-water supplying pipes P0 to P5, and evaporated.

In this manner, in the air pollution control system 10D according to the fourth embodiment, fine substances such as mercury, boron, selenium, and halogen ions contained in the desulfurized waste water 28 discharged from the desulfurizer 15 are solidified, the solid substance is separated together with the gypsum 37 by the solid-liquid separating device 35, and the separate liquid 42 is supplied into the path for supplying the fuel F to the boiler 11, the inside of a furnace of the boiler 11, the inside of the flue gas duct D, and the inside of the bypass pipes 32 and 33. By having such a configuration, an increase in mercury concentration in the flue gas 17 inside of the flue gas duct D can be prevented at the time of atomizing waste water, in addition to effects of the second embodiment that an amount of dry particles generated due to evaporation of waste water can be decreased. The solid substances and concentrates generated in the waste-water treatment device 38 are separated and removed together with the gypsum 37 by the solid-liquid separating device 35 on the downstream side, and thus a filtering process in the waste-water treatment device 38 can be omitted.

Fifth Embodiment

An air pollution control system according to a fifth embodiment is explained next. Constituent elements identical to those in the first to fourth embodiments described above are denoted by like reference signs and explanations thereof will be omitted. FIG. 5 is a schematic configuration diagram of an air pollution control system 10E according to the fifth embodiment. In the fifth embodiment, a second waste-water treatment device 38B is further provided on the downstream side of the solid-liquid separating device 35, in addition to the configuration of the fourth embodiment. The configuration of the second waste-water treatment device 38B is the same as that of a first waste-water treatment device 38A installed on the upstream side of the solid-liquid separating device 35.

The desulfurized waste water 28 discharged from the desulfurizer 15 is first supplied to the first waste-water treatment device 38A, where fine substances such as mercury, boron, and selenium contained in the desulfurized waste water 28 are solidified by the means of cohesion, adsorption on activated carbon, chelating agent, or crystallization described above. Halogen ions such as $Cl^-$, $Br^-$, $I^-$, and $F^-$ become concentrated by the concentration means using the reverse osmosis membrane, ion exchange membrane, or electrodialysis, or distillation described above. The treated waste water 41 containing solid substances such as mercury and concentrates of halogen ions is supplied to the solid-liquid separating device 35 via the waste water line 29, and the solid substances and the concentrates are separated and removed together with the gypsum 37 containing mercury chloride. The separate liquid 42 separated by the solid-liquid separating device 35 is supplied to the second waste-water treatment device 38B, where a small amount of mercury and halogen ions remaining in the separate liquid 42 are removed. Treated waste water 43 treated by the second waste-water treatment device 38B is supplied to the waste water tank 31. The treated waste water 42 accumulated in the waste water tank 31 is supplied into the path for supplying the fuel F to the boiler 11, the inside of a furnace of the boiler 11, the inside of the flue gas duct D, and the inside of the bypass pipes 32 and 33 via the waste-water supplying pipes P0 to P5, and evaporated.

As described above, in the air pollution control system 10E according to the fifth embodiment, after fine substances such as mercury, boron, selenium, and halogen ions in the desulfurized waste water 28 discharged from the desulfurizer 15 are solidified by the first waste-water treatment device 38A, the solid substances are separated together with the gypsum 37 by the solid-liquid separating device 35. The treated waste water 43 after a small amount of mercury and halogen ions remaining in the separate liquid 42 are removed by the second waste-water treatment device 38B is then supplied into the path for supplying the fuel F to the boiler 11, the inside of a furnace of the boiler 11, the inside of the flue gas duct D, and the inside of the bypass pipes 32 and 33. By performing waste water treatment highly accurately in this manner, dry particles are hardly generated when the treated waste water 43 is atomized into the flue gas 17 and evaporated, and an increase in mercury concentration in the flue gas 17 inside the flue gas duct D can be prevented reliably at the time of atomizing waste water.

INDUSTRIAL APPLICABILITY

As described above, the air pollution control system and the air pollution control method according to the present invention are useful for decreasing desulfurized waste water discharged from a desulfurizer or completely eliminating discharge of desulfurized waste water to outside.

Reference Signs List 10A, 10b, 10C, 10D, 10E air pollution control system
11 boiler
12 $NO_x$ removal equipment
13 air heater
14 precipitator
15 desulfurizer
16 waste-water atomizing device
17 flue gas
20 limestone slurry
21 limestone-slurry supply system
22 column bottom part
23 nozzle
24 column top part
26 purged gas
27 stack 28 desulfurized waste water
29 waste water line
31 waste water tank
32 bypass pipe
33 bypass pipe
35 solid-liquid separating unit
36, 42 separate liquid
37 gypsum
38 waste-water treatment device
39, 41, 43 treated waste water
P0, P1, P2, P3, P4, P5 waste-water supply pipe (waste-water supplying unit)
N1, N2, N3, N4, N5 nozzle
F fuel

The invention claimed is:

1. An air pollution control system comprising:
a boiler that burns fuel;
an air heater that recovers heat of flue gas from the boiler;
a desulfurizer that reduces sulfur oxides contained in flue gas after heat recovery by an absorbent;
a waste-water treating unit that removes harmful substances from desulfurized waste water discharged from the desulfurizer; and
a waste-water supplying unit installed at least at one position in a path for supplying fuel to the boiler, inside of a furnace of the boiler, or inside of a flue between the boiler and the air heater to atomize treated waste water treated by the waste-water treating unit,
wherein the waste-water treating unit includes a solid-liquid separating device that separates desulfurized waste water discharged from the desulfurizer into a solid and a liquid, and
the solid-liquid separating device is a belt filter.

2. The air pollution control system according to claim 1, wherein a $NO_x$ removal equipment that removes nitrogen oxides in flue gas from the boiler is provided on an upstream side of the air heater, and the waste-water supplying unit is provided at least at one position between the boiler and the $NO_x$ removal equipment or between the $NO_x$ removal equipment and the air heater.

3. The air pollution control system according to claim 2, wherein a bypass pipe is provided at least at one position parallel to the NOx removal equipment or parallel to the air heater, and the waste-water supplying unit is provided in the bypass pipe.

4. The air pollution control system according to claim 1, wherein the waste-water treating unit includes a mercury removing device that removes mercury contained in desulfurized waste water discharged from the desulfurizer.

5. The air pollution control system according to claim 1, wherein the waste-water treating unit includes a halogen-ion removing device that removes halogen ions contained in desulfurized waste water discharged from the desulfurizer.

6. An air pollution control method in which after heat of flue gas from a boiler that burns fuel is recovered by an air heater, a desulfurizer reduces sulfur oxides contained in flue gas after heat recovery by an absorbent, wherein
after waste water treatment is performed for removing harmful substances in desulfurized waste water discharged from the desulfurizer, treated waste water treated in the waste water treatment is supplied to at least one of a path for supplying fuel to the boiler, inside of a furnace of the boiler, and inside of a flue gas duct between the boiler and the air heater, and
the waste water treatment includes a solid-liquid separating step of separating desulfurized waste water discharged from the desulfurizer into a solid and a liquid by using a belt filter.

7. The air pollution control method according to claim 6, wherein a $NO_x$ removal equipment that removes nitrogen oxides in flue gas from the boiler is provided on an upstream side of the air heater, and the treated waste water is supplied to at least one position between the boiler and the $NO_x$ removal equipment or between the $NO_x$ removal equipment and the air heater.

8. The air pollution control method according to claim 7, wherein a bypass pipe is provided at least at one position parallel to the $NO_x$ removal equipment or parallel to the air heater, and the treated waste water is supplied to inside of the bypass pipe.

9. The air pollution control method according to claim 6, wherein the waste water treatment includes a mercury removing step of removing mercury contained in desulfurized waste water discharged from the desulfurizer.

10. The air pollution control method according to claim 6, wherein the waste water treatment includes a halogen-ion removing step of removing halogen ions contained in desulfurized waste water discharged from the desulfurizer.

* * * * *